United States Patent
Steinmetz et al.

(10) Patent No.: US 7,960,457 B2
(45) Date of Patent: Jun. 14, 2011

(54) AQUEOUS MIXTURES CURABLE PHYSICALLY, THERMALLY OR THERMALLY AND WITH ACTINIC RADIATION

(75) Inventors: Bernhard Steinmetz, Rutschenhausen (DE); Frank Jansing, Tauberbischofsheim (DE); Ingo Luer, Munster (DE); Norbert Low, Neustadt/Aisch (DE)

(73) Assignee: BASF Coatings AG, Munster (DE)

( * ) Notice: Subject to any disclaimer, the term of this patent is extended or adjusted under 35 U.S.C. 154(b) by 474 days.

(21) Appl. No.: 12/097,071

(22) PCT Filed: Oct. 25, 2006

(86) PCT No.: PCT/EP2006/010266
§ 371 (c)(1),
(2), (4) Date: Jun. 12, 2008

(87) PCT Pub. No.: WO2007/048587
PCT Pub. Date: May 3, 2007

(65) Prior Publication Data
US 2010/0292377 A1    Nov. 18, 2010

(30) Foreign Application Priority Data
Oct. 26, 2005   (DE) .................. 10 2005 051 238

(51) Int. Cl.
*C08K 5/521*    (2006.01)
(52) U.S. Cl. .................................................. 524/140
(58) Field of Classification Search ............ 524/140
See application file for complete search history.

(56) References Cited

U.S. PATENT DOCUMENTS
6,743,466 B2   6/2004   Flosbach et al.

FOREIGN PATENT DOCUMENTS

| | | |
|---|---|---|
| DE | 1794245 A1 | 10/1971 |
| DE | 4009858 A1 | 10/1991 |
| DE | 4437535 A1 | 4/1996 |
| DE | 19818735 A1 | 10/1999 |
| DE | 19914896 A1 | 10/2000 |
| DE | 19930067 A1 | 1/2001 |
| DE | 19940855 A1 | 3/2001 |
| DE | 10004494 A1 | 8/2001 |
| DE | 10043405 C1 | 6/2002 |
| DE | 10130972 C1 | 11/2002 |
| DE | 10202565 A1 | 8/2003 |
| DE | 10306358 A1 | 9/2004 |
| DE | 10316890 A1 | 11/2004 |
| EP | 0273390 A2 | 7/1988 |
| EP | 0507633 A2 | 10/1992 |
| EP | 0551568 A2 | 7/1993 |
| EP | 1318525 A | 6/2003 |
| EP | 1413608 A1 | 4/2004 |
| JP | 11100419 A | 4/1999 |
| JP | 2001084570 A | 3/2001 |
| JP | 2001106971 A | 4/2001 |
| WO | WO9215405 A1 | 9/1992 |
| WO | WO9411123 A1 | 5/1994 |
| WO | WO0220672 A2 | 3/2002 |

OTHER PUBLICATIONS

Written Opinion of PCT/EP2006/010266 filed Oct. 25, 2006.
International Search Report of PCT/EP2006/010266 filed Oct. 25, 2006.
International Preliminary Report for PCT/EO2006/010266 dated Jun. 11, 2008.

*Primary Examiner* — Peter Szekely
(74) *Attorney, Agent, or Firm* — Cantor Colburn LLP

(57) ABSTRACT

Disclosed herein is an aqueous mixture curable physically, thermally or both thermally and with actinic radiation, comprising (A) at least one polyurethane binder, which is ionically stabilized, nonionically stabilized, or a combination thereof, and which is saturated, unsaturated, grafted with olefinically unsaturated compounds, or a combination thereof; (B) at least one pigment, which is a color pigment, effect pigment, or a combination thereof; and (C) at least one phosphoric ester of the general formula $(R^1ORO)_3P=O$, wherein R is an alkanediyl group comprising 2 to 10 carbon atoms and $R^1$ is an alkyl group comprising 2 to 10 carbon atoms. Also disclosed is a process for preparing the foregoing aqueous mixture, and color and/or effect thermoset or thermoplastic materials comprising the same.

18 Claims, No Drawings

AQUEOUS MIXTURES CURABLE PHYSICALLY, THERMALLY OR THERMALLY AND WITH ACTINIC RADIATION

CROSS REFERENCE TO RELATED APPLICATIONS

This Application is the National Stage of International Application No. PCT/EP2006/010266, filed Oct. 25, 2006, which claims priority to German Application No. 10 2005 051 238.0, filed Oct. 26, 2005.

FIELD OF THE INVENTION

The present invention relates to new aqueous mixtures curable physically, thermally or both thermally and with actinic radiation. The present invention also relates to a new process for preparing aqueous mixtures curable physically, thermally or both thermally and with actinic radiation. The present invention further relates to the use of the new aqueous mixtures curable physically, thermally or both thermally and with actinic radiation and of the aqueous mixtures prepared by the new process and curable physically, thermally or both thermally and with actinic radiation.

BACKGROUND

It is known that tris(2-butoxyethyl) phosphate (referred to below for the sake of brevity as "TBEP") is used as a plasticizer for synthetic rubbers (cf. Römpp Online 2005, "Plasticizers").

TBEP and tris(2-hexoxyethyl) phosphate (referred to below for the sake of brevity as "THEP") are used as defoamers, dispersing assistants, freeze/thaw stabilizers, flow control agents, and agents for preventing excessively rapid dryout in latex paints based on acrylic latices, polyvinyl acetate latices, vinyl-acrylic latices, vinyl-ethylene latices, styrene-butadiene copolymer latices, and polyvinyl chloride-acrylic latices (cf. German laid-open specification DE 1794245).

German patent DE 100 43 405 C1 discloses a thermally curable aqueous basecoat material or solid-color topcoat material which comprises at least one ionically and/or nonionically stabilized polyurethane binder which is saturated, unsaturated and/or grafted with olefinically unsaturated compounds, at least one color and/or effect pigment, and at least one triorganophosphate such as tributyl phosphate. The purpose of the triorganophosphates is to adjust the water vapor permeability of the solid-color topcoats or basecoats produced from the known aqueous basecoat materials or solid-color topcoat materials. The popping limit of these coating systems is situated at a dry film thickness of 27 to 28 µm. Their pinhole limit, i.e., the dry film thickness up to which no pinholes occur, does, however, need to be raised further.

SUMMARY

It was an object of the present invention to provide new aqueous mixtures, curable physically, thermally or both thermally and with actinic radiation, which comprise at least one ionically and/or nonionically stabilized polyurethane binder, saturated, unsaturated and/or grafted with olefinically unsaturated compounds, and at least one color and/or effect pigment.

The new aqueous mixtures curable physically, thermally or both thermally and with actinic radiation ought in a simple way to be very reproducibly preparable, storage-stable, transportable, and shearing-stable. They ought in a simple way to be unproblematically processible, especially appliable, and to be rapidly curable.

They ought to be highly suitable for producing new color and/or effect, thermoset or thermoplastic materials which even at high coat thicknesses are free from physical defects, being free in particular from pops and pinholes.

In particular, as new coating materials, adhesives, and sealants and also precursors of moldings and sheets, particularly as new coating materials, they ought to be suitable for producing new color and/or effect coatings, adhesive layers, and seals, and also moldings and sheets, particularly for producing new color and/or effect coatings.

The resultant new color and/or effect coatings, particularly the new priming coats, corrosion control coats, surfacer coats, antistonechip priming coats, functional coats, basecoats, and solid-color topcoats, ought to combine a high popping limit with a high pinholing limit.

The new color and/or effect coatings ought to continue to exhibit, if not indeed to exceed, the outstanding profile of performance properties of the known coatings. In particular they ought to be free from light/dark shading (clouds) and to have an outstanding overall appearance.

Found accordingly have been the new aqueous mixtures curable physically, thermally or both thermally and with actinic radiation which comprise
(A) at least one ionically and/or nonionically stabilized polyurethane binder which is saturated, unsaturated and/or grafted with olefinically unsaturated compounds,
(B) at least one color and/or effect pigment, and
(C) at least one phosphoric ester of the general formula I:

$$(R^1ORO)_3P=O \quad (I),$$

in which the variables are defined as follows:
R: alkanediyl group having 2 to 10 carbon atoms and
$R^1$: alkyl group having 2 to 10 carbon atoms,
and which are referred to below as "mixtures of the invention".

Also found has been the new process for preparing the mixtures of the invention, which involves mixing constituents (A), (B), and (C) with one another in the presence of water and homogenizing the resulting mixture, and which is referred to below as "process of the invention".

Found not least has been the new use of the mixtures of the invention and of the mixtures of the invention prepared by the process of the invention for producing new color and/or effect thermoset and thermoplastic materials, this being referred to below as "inventive use".

Additional subject matter of the invention will become apparent from the description.

DETAILED DESCRIPTION

In the light of the prior art it was surprising and unforeseeable for the skilled worker that the object on which the present invention was based could be achieved by means of the mixtures of the invention, the process of the invention, and the inventive use.

In particular it was surprising that the mixtures of the invention were in a simple way very reproducibly preparable, storage-stable, transportable, and shearing-stable. In a simple way they were unproblematically processible, in particular appliable, and could be cured rapidly.

In the context of the inventive use they were outstandingly suitable for producing new color and/or effect thermoset or thermoplastic materials, especially thermoset materials, which even at high coat thicknesses were free from physical defects, being free in particular from pops and pinholes.

They were suitable in particular as coating materials, adhesives, and sealants, and also precursors of moldings and sheets, of the invention, especially as coating materials of the invention, for producing new color and/or effect coatings, adhesive layers, and seals, and also moldings and sheets, particularly for producing new color and/or effect coatings.

The resulting coatings of the invention, particularly the priming coats, corrosion control coats, surfacer coats, antistonechip priming coats, functional coats, basecoats, and solid-color topcoats, combined a particularly high popping limit with a high pinholing limit.

At the same time the coatings of the invention continued to exhibit the outstanding profile of performance properties of the known coatings, and in many cases, indeed, exceeded it. In particular they were free from light/dark shading (clouds) and exhibited an outstanding overall appearance.

The mixtures of the invention are aqueous. This means that its constituents (A), (B), and (C), and also, where used, (D), as described below, are in solution and/or dispersion in water.

The mixtures of the invention may be physically curable.

For the purposes of the present invention the term "physical curing" denotes the curing of a mixture, especially of a coating material, by filming as a result of loss of solvent from the mixture, with linking within the resulting thermoplastic material, particularly the coating, taking place via looping of the polymer molecules of the binders (regarding the term cf. Römpp Lexikon Lacke and Druckfarben, Georg Thieme Verlag, Stuttgart, N.Y., 1998, "Binders", pages 73 and 74). Or else filming takes place via the coalescence of binder particles (cf. Römpp Lexikon Lacke and Druckfarben, Georg Thieme Verlag, Stuttgart, N.Y., 1998, "Curing", pages 274 and 275).

The mixtures of the invention may be thermally curable.

Thermal curing may take place via what is called the self-crosslinking of constituents of the mixtures of the invention.

In order to set this property the mixtures of the invention contain complementary reactive functional groups, which with the hydroxyl groups present and/or complementary reactive functional groups other than hydroxyl groups, enter into reactions which are initiated and maintained thermally, and/or contain autoreactive functional groups, which are able to react "with themselves".

Alternatively, thermal curing may take place via what is called the external crosslinking of constituents of the mixtures of the invention.

In order to set this property the mixtures of the invention contain at least two constituents, each of which contains one kind of complementary reactive functional groups, which together with one another are able to enter into reactions that are initiated and maintained thermally.

The mixtures of the invention may be curable both thermally and with actinic radiation, this also being referred to as dual cure.

In order to be curable with actinic radiation the mixtures of the invention contain bonds which can be activated with actinic radiation and which, under irradiation, become activated and, together with other activated bonds of their kind, enter into polymerization reactions and/or crosslinking reactions which proceed in accordance with free-radical and/or ionic mechanisms.

Actinic radiation here and below means electromagnetic radiation, such as near infrared (NIR), visible light, UV radiation, X-radiation or gamma radiation, especially UV radiation, or particulate radiation, such as electron beams, beta radiation, alpha radiation, proton beams or neutron beams, especially electron beams.

In particular the mixtures of the invention are thermally curable, it being possible for physical curing to assist thermal curing.

The inventively essential constituent of the mixtures of the invention is at least one, especially one, phosphoric ester (C) of the general formula I:

$$(R^1ORO)_3P=O \qquad (I),$$

in which the variables are defined as follows:
R: alkanediyl group having 2 to 10, preferably 2 to 7, and in particular 2 to 4 carbon atoms, and
$R^1$: alkyl group having 2 to 10, preferably 2 to 7, and in particular 2 to 6 carbon atoms.

The alkanediyl group R can be linear or branched. Preferably it is linear.

The alkyl group $R^1$ can be linear or branched. Preferably it is linear.

The alkanediyl group R is preferably selected from the group consisting of ethylene, trimethylene, tetramethylene, pentamethylene, hexamethylene, heptane-1,7-diyl, octane-1,8-diyl, nonane-1,9-diyl and decane-1,10-diyl, more preferably from ethylene, trimethylene and tetramethylene. In particular the alkanediyl group R is ethylene.

The alkyl group $R^1$ is preferably selected from the group consisting of ethyl, propyl, n-butyl, n-pentyl, n-hexyl, n-heptyl, n-octyl, n-nonyl and n-decyl, more preferably from ethyl, propyl, n-butyl, n-pentyl and n-hexyl. In particular the alkyl group $R^1$ is n-butyl.

With very particular preference the phosphoric esters (C) are selected from the group consisting of tris(2-butoxyethyl) phosphate (TBEP) and tris(2-hexoxyethyl) phosphate (THEP). In particular TBEP is used.

The amount of phosphoric ester (C) in the mixtures of the invention may vary widely and can therefore be adapted outstandingly to the requirements of the case in hand. Preferably the mixtures of the invention contain the phosphoric ester (C) in an amount of 0.1% to 5%, more preferably 0.5% to 4%, and in particular 1% to 3%, by weight, based in each case on the mixture of the invention.

The second essential constituent of the mixtures of the invention is at least one ionically and/or nonionically stabilized polyurethane (A) which is saturated, unsaturated and/or grafted with olefinically unsaturated compounds and which is used as a binder (cf. Römpp Online 2005, "Binders").

Polyurethanes (A) are customary and known and are described in detail in, for example, German patent applications
DE 199 14 896 A1, column 4, line 23, to column 11, line 5, in conjunction with column 1, lines 9 to 56, and column 19, line 12, to column 20, line 6,
DE 44 37 535 A1, page 2, line 24, to page 6, line 22, and page 7, line 20, to page 8, line 49,
DE 100 43 405 C1, column 11, line 24, to column 12, line 11,
DE 100 04 494 A1, column 5, line 16, to column 11, line 50, in conjunction with column 1, lines 10 to 24, and column 18, lines 15 to 31, and
DE 40 09 858 A1, column 6, line 17, to column 10, line 23, and column 16, lines 10 to 35,
or in international patent application
WO 92/15405, page 2, line 35, to page 3, line 22, page 3, line 33, to page 10, line 33, page 14, line 13, to page 15, line 13.

The amount of the polyurethanes (A) in the mixtures of the invention may vary very widely and can therefore be adapted outstandingly to the requirements of the case in hand. It is preferred to use the polyurethanes (A) in the amounts as described in the patent applications referred to above. The amount is preferably 10% to 80%, more preferably 15% to 70%, and in particular 20% to 60%, by weight, based in each case on the film-forming solids of the mixtures of the invention.

Here and below, "film-forming solids" means the sum of the constituents of a mixture of the invention which constitute the thermoset and thermoplastic materials of the invention that are produced from it.

The third essential constituent of the mixtures of the invention is at least one color and/or effect pigment (B).

The number of different color and/or effect pigments (B) present in a mixture of the invention may vary widely and is guided in particular by the optical effects and/or hues which are to be brought about.

Examples of suitable color and/or effect pigments (B) are known from German patent applications
DE 103 06 358 A1, page 6, paragraphs [0055] to [0058], or
DE 100 04 494 A1, column 11, line 51, to column 12, line 34.

The amount of color and/or effect pigments (B) in the mixtures of the invention may vary very widely. It is guided in particular by the intensity of the optical effects and hues to be brought about.

The skilled worker is easily able to select the pigments and amounts thereof that are suitable for a desired optical effect and/or hue on the basis of his or her general art knowledge, with the assistance of range-finding colorimetric investigations.

The mixtures of the invention may further comprise at least one additive (D). Preference is given to using additives (D) such as are customary and known within the field of coating materials. Preferably the additives (D) are selected from the group consisting of binders other than the binders (A), crosslinking agents, neutralizing agents, crosslinking catalysts, adhesion promoters, additives for enhancing substrate wetting, additives for enhancing surface smoothness, matting agents, light stabilizers, polymerization inhibitors, corrosion inhibitors, biocides, flame retardants, thermal crosslinking initiators, photoinitiators, fluorescent, electrically conductive and/or magnetically shielding pigments other than the pigments (B), and metal powders, organic and inorganic, transparent or opaque fillers and nanoparticles, organic dyes, rheological assistants, flow control agents, wetting agents, emulsifiers, defoamers, and organic solvents other than the phosphoric esters (C).

Examples of suitable additives (D) are known from German patent applications
DE 103 06 358 A1, page 6, paragraph [0059], to page 7, paragraph [0068],
DE 100 04 494 A1, column 3, line 38, to column 5, line 9, and column 12, line 35, to column 15, line 1, and
DE 199 14 896 A1, column 11, line 6, to column 13, line 52, and column 14, line 16, to column 15, line 63.

The amount of the additives (D) in the mixtures of the invention may vary widely, and so can be tailored to the particular end use. Preferably the additives (D) are used in the customary, known, effective amounts. These are familiar to the skilled worker from his or her general art knowledge, with the details in the abovementioned German patent applications able to serve him or her as a guideline.

The film-forming solids in the mixtures of the invention may vary widely and may therefore be adapted outstandingly to the requirements of the particular end use. It is a very particular advantage of the mixtures of the invention that they can have a high level of film-forming solids. The film-forming solids is preferably 10% to 60%, more preferably 15% to 50%, and in particular 15% to 40%, by weight, based in each case on a mixture of the invention.

The mixtures of the invention are preferably prepared by the process of the invention, which involves mixing at least one binder (A), at least one color and/or effect pigment (B), and at least one phosphoric ester (C) with one another in the presence of water and homogenizing the resulting mixture. Preferably, in addition, at least one additive (D) is added.

For this procedure it is preferred to make use of the customary, known mixing methods and apparatus such as ultrasound baths, stirred tanks, agitator mills, extruders, compounders, Ultraturrax devices, inline dissolvers, static mixers, micromixers, toothed wheel dispersers, pressure release nozzles and/or microfluidizers, in the absence of actinic radiation if appropriate.

In the context of the inventive use, the mixtures of the invention serve for producing the thermoset and thermoplastic materials, especially thermoset materials, of the invention.

In the context of the inventive use the mixtures of the invention serve preferably as coating materials, adhesives, and sealants of the invention and also as precursors of the invention to moldings and sheets, particularly as coating materials, for producing coatings, adhesive layers, and seals of the invention and also of moldings and sheets, but especially coatings.

With particular preference the coating materials of the invention are used as primers, corrosion control coating materials, functional coating materials, surfacers or priming paints, aqueous basecoat materials and solid-color topcoat materials, especially aqueous basecoat materials, for producing priming coats, corrosion control coats, functional coats, surfacer coats, antistonechip priming coats, basecoats, and solid-color topcoats.

Functional coatings are coatings capable of taking on a plurality of functions, such as the functions of a surfacer coat and of a basecoat, for example.

The coatings of the invention may be single-coat or multicoat systems. With very particular preference they are multicoat systems and in that case may encompass at least two coatings, in particular at least one electrocoat, at least one surfacer coat or antistonechip priming coat, and also at least one basecoat and at least one clearcoat or at least one solid-color topcoat. With particular preference the multicoat paint systems of the invention encompass at least one basecoat and at least one clearcoat.

It is of particular advantage to produce the basecoat of the multicoat paint systems of the invention from the mixtures of the invention. The basecoats of the invention constitute, accordingly, the color and/or effect coats of the multicoat paint systems that substantially determine the overall appearance.

The basecoats of the invention combine, surprisingly, a particularly high popping limit with a high pinholing limit. They are free from other paint defects such as clouds, bits, pimples, craters, orange peel, and cracks. They have outstanding intercoat adhesion. Because the aqueous basecoat materials of the invention provide especially effective dispersal of the color and/or effect pigments (B), the basecoats of the invention, even at a comparatively low pigment/binder ratio, exhibit an especially high hiding power and outstanding optical effects, which, moreover, can be outstandingly reproduced.

Depending on the intended use the mixtures of the invention are applied to customary, known temporary or permanent substrates.

For producing sheets and moldings of the invention it is preferred to use customary, known temporary substrates, such as metallic and polymeric belts or hollow bodies made of metal, glass, plastic, wood or ceramic, which are easily removable without damaging the sheets and moldings of the invention.

Where the mixtures of the invention are used for producing coatings, adhesives layers, and seals, permanent substrates are employed.

The substrates in question are preferably
- means of land, water or air transport that are operated by muscle power, hot air or wind, such as cycles, railroad trolleys, rowboats, sailboats, hot air balloons, gas balloons or sailplanes, and also parts thereof,
- motorized means of land, water or air transport, such as motorcycles, utility vehicles or motor vehicles, especially automobiles, water going or underwater craft or aircraft, and also parts thereof,
- stationary floating structures, such as buoys or parts of harbor installations,
- the interior and exterior of buildings,
- doors, windows, and furniture, and
- hollow glassware,
- small industrial parts, such as nuts, bolts, hubcaps or wheel rims,
- containers, such as coils, freight containers or packaging,
- electrical components, such as electronic windings, coils for example,
- optical components,
- mechanical components, and
- white goods, such as household appliances, boilers, and radiators.

The sheets and moldings of the invention may likewise serve as substrates.

In particular the substrates are automobile bodies or parts thereof. In this context the mixtures of the invention and the coatings of the invention produced from them serve preferably for the OEM finishing of automobile bodies or for the refinishing of inventive and noninventive OEM finishes. The OEM finishes of the invention, particularly those which include a basecoat of the invention, feature outstanding overpaintability. The refinishes of the invention adhere outstandingly to the inventive and noninventive OEM finishes.

In terms of method the application of the mixtures of the invention has no peculiarities, but may instead take place by any of the customary, known application methods suitable for the mixture in question, such as injecting, spraying, knifecoating, spreading, pouring, dipping, trickling or rolling, for example. Preference is given to employing spray application methods.

In the course of application it is advisable to operate in the absence of actinic radiation if the mixtures of the invention are additionally curable with actinic radiation.

For producing the multicoat paint systems of the invention it is possible in particular to employ wet-on-wet methods and coat systems of the kind known, for example, from German patent applications
- DE 100 43 405 C1, column 2, paragraph [0009], to column 3, paragraph [0017], and column 8, paragraph [0052], to column 9, paragraph [0056],
- DE 199 14 98 A1, column 16, line 54, to column 18, line 54,
- DE 199 30 067 A1, page 15, line 23, to page 16, line 36, or
- DE 199 40 855 A1, column 30, line 39, to column 31, line 48, and column 32, lines 15 to 29.

It is a key advantage of the inventive use that in principle the priming coats, corrosion control coats, functional coats, surfacer coats, antistonechip priming coats, basecoats, and solid-color topcoats, but especially the basecoats, of the multicoat paint systems of the invention can be produced from the mixtures of the invention.

The mixtures of the invention are generally cured after a certain rest time or flash off time. This may have a duration of 30 s to 2 h, preferably 1 min to 1 h, and in particular 1 to 45 min. The rest time serves, for example, for the flow and devolatilization of the applied mixtures of the invention and for the evaporation of volatile constituents such as any solvent present. Flashing off may be accelerated by means of an elevated temperature, but not one sufficient for curing, and/or by means of a reduced atmospheric humidity.

The thermal curing of the applied mixtures of the invention takes place with the aid for example of a gaseous, liquid and/or solid, hot medium, such as hot air, heated oil or heated rollers, or of microwave radiation, infrared light and/or near infrared (NIR) light. Heating takes place preferably in a forced-air oven or by exposure to IR and/or NIR lamps. As in the case of curing with actinic radiation, thermal curing as well may take place in stages. Thermal curing takes place advantageously at temperatures from room temperature to 200° C.

The thermal curing of the mixtures of the invention may also be carried out with substantial or complete exclusion of oxygen.

For the purposes of the present invention, oxygen is regarded as substantially excluded if its concentration at the surface of the applied mixtures of the invention is <21%, preferably <18%, more preferably <16%, very preferably <14%, with very particular preference <10%, and in particular <6% by volume.

For the purposes of the present invention, oxygen is considered completely excluded if its concentration at the surface is below the detection limit of the customary, known methods of detection.

Preferably the concentration of oxygen is ≧0.001%, more preferably ≧0.01%, very preferably ≧0.1%, and in particular ≧0.5% by volume.

The desired concentrations of the oxygen can be set by means of the measures described in German patent DE 101 30 972 C1, page 6, paragraphs [0047] to [0052], or by the placing of films.

Curing with actinic radiation may be carried out by means of the customary, known apparatus and methods of the kind described, for example, in German patent application DE 198 18 735 A1, column 10, lines 31 to 61, German patent application DE 102 02 565 A1, page 9, paragraph [0092], to page 10, paragraph [0106], German patent application DE 103 16 890 A1, page 17, paragraphs [0128] to [0130], international patent application WO 94/11123, page 2, line 35, to page 3, line 6, page 3, lines 10 to 15, and page 8, lines 1 to 14, or the U.S. Pat. No. 6,743,466 B2, column 6, line 53, to column 7, line 14.

The thermoset and thermoplastic materials, especially thermoset materials, of the invention, particularly the sheets, moldings, coatings, adhesive layers, and seals of the invention, are outstandingly suitable for coating, bonding, sealing, wrapping, and packing the substrates described above.

The resultant substrates of the invention coated with coatings of the invention, bonded with adhesive layers of the invention, sealed with seals of the invention and/or wrapped or packaged with sheets and/or moldings of the invention, have outstanding service properties in conjunction with a particularly long service life.

INVENTIVE AND COMPARATIVE EXAMPLE

Comparative Example

The Preparation of Aqueous Basecoat Material C1 and Production of Multicoat Paint System C1

Example 1 of German patent DE 100 43 405 C1, column 12, line 57, to column 13, line 1, in conjunction with column 11, line 26, to column 12, line 31, was repeated. The aqueous basecoat material C1 in question contained tributyl phosphate. Visual evaluation of the basecoat C1, applied in the form of a wedge, indicated a pinholing limit of 20 µm and a popping limit of 26 µm.

Inventive Example

The Preparation of Aqueous Basecoat Material 1 and Production of Multicoat Paint System 1

The comparative example was repeated but using, instead of tributyl phosphate, equal amounts of TBEP. The visual evaluation of the basecoat 1, applied in the form of a wedge, indicated a pinholing limit of 23 µm and a popping limit of 43 µm. In other respects the multicoat paint system 1 had the same advantageous properties as the multicoat paint system C1.

The results underline the fact that TBEP has the capacity to increase significantly the pinholing limit, and especially the popping limit, without detriment to the other key performance properties.

What is claimed is:

1. An aqueous mixture curable physically, thermally or both thermally and with actinic radiation, comprising:
   (A) at least one polyurethane binder, which is ionically stabilized, nonionically stabilized, or a combination thereof, and which is saturated, unsaturated, grafted with olefinically unsaturated compounds, or a combination thereof;
   (B) at least one pigment, which is a color pigment, effect pigment, or a combination thereof; and
   (C) at least one phosphoric ester of the general formula 1:

$$(R^1ORO)_3P{=}O \qquad (I),$$

wherein R is an alkanediyl group comprising 2 to 10 carbon atoms and $R^1$ is an alkyl group comprising 2 to 10 carbon atoms.

2. The aqueous mixture of claim 1, wherein the alkanediyl group R is selected from the group consisting of ethylene, trimethylene, tetramethylene, pentamethylene, hexamethylene, heptane-1,7-diyl, octane-1,8-diyl, nonane-1,9-diyl and decane-1,10-diyl.

3. The aqueous mixture of claim 2 wherein the alkanediyl group R is selected from the group consisting of ethylene, trimethylene and tetramethylene.

4. The aqueous mixture of claim 3, wherein the alkanediyl group R is ethylene.

5. The aqueous mixture of claim 1, wherein the alkyl group $R^1$ is selected from the group consisting of ethyl, propyl, n-butyl, n-pentyl, n-hexyl, n-heptyl, n-octyl, n-nonyl and n-decyl.

6. The aqueous mixture of claim 5, wherein the alkyl group $R^1$ is selected from the group consisting of ethyl, propyl, n-butyl, n-pentyl and n-hexyl.

7. The aqueous mixture of claim 6, wherein the alkyl group $R^1$ is n-butyl.

8. The aqueous mixture of claim 4 or 7, wherein the at least one phosphoric ester (C) is tris(2-butoxyethyl) phosphate.

9. The aqueous mixture of claim 1, comprising the at least one phosphoric ester (C) in an amount of 0.1% to 5% by weight, based on the aqueous mixture.

10. The aqueous mixture of claim 1, further comprising at least one additive (D).

11. The aqueous mixture of claim 10, wherein the at least one additive (D) is selected from the group consisting of binders other than the at least one polyurethane binders (A), crosslinking agents, neutralizing agents, crosslinking catalysts, adhesion promoters, additives for enhancing substrate wetting, additives for enhancing surface smoothness, matting agents, light stabilizers, polymerization inhibitors, corrosion inhibitors, biocides, flame retardants, thermal crosslinking initiators, photoinitiators, fluorescent, electrically conductive shielding pigments other than the at least one pigment (B), magnetically shielding pigments other than the at least one pigment (B), metal powders, organic transparent fillers, organic opaque fillers, inorganic, transparent fillers, inorganic opaque fillers, organic transparent nanoparticles, organic opaque nanoparticles, inorganic transparent nanoparticles, inorganic opaque nanoparticles, organic dyes, rheological assistants, flow control agents, wetting agents, emulsifiers, defoamers, and organic solvents other than the at least one phosphoric ester (C).

12. A process for preparing the aqueous mixture curable physically, thermally or both thermally and with actinic radiation of claim 1, comprising mixing the at least one polyurethane binder (A), the at least one pigment (B), and the at least one phosphoric ester (C) with one another in the presence of water and homogenizing the resulting mixture.

13. The process of claim 12, further comprising mixing at least one additive (D).

14. Color and/or effect thermoset or thermoplastic materials comprising the aqueous mixture curable physically, thermally or both thermally and with actinic radiation of claim 1.

15. The color and/or effect thermoset or thermoplastic materials of claim 14, wherein the color and/or effect thermoset or thermoplastic materials are coatings, adhesive layers, seals, moldings or sheets.

16. The color and/or effect thermoset or thermoplastic materials of claim 15, wherein the coating materials are used as primers, priming paints, surfacers, basecoat materials, solid-color topcoat materials or clearcoat materials for producing single-coat or multicoat primer coats, corrosion control coats, antistonechip priming coats, surfacer coats, functional coats, basecoats or solid-color topcoats.

17. The color and/or effect thermoset or thermoplastic materials of claim 16, wherein the basecoat materials comprise single-coat or multicoat basecoats as part of multicoat color and/or effect paint systems.

18. The color and/or effect thermoset or thermoplastic materials of claim 17, wherein the multicoat color and/or effect paint systems are produced with the aid of wet-on-wet methods.

* * * * *